United States Patent
Park

[11] Patent Number: 6,046,862
[45] Date of Patent: Apr. 4, 2000

[54] ZOOM LENS SYSTEM

[75] Inventor: Cheon-Ho Park, Kyungki-do, Rep. of Korea

[73] Assignee: Samsung Aerospace Industries, Ltd., Kyongsangnam-do, Rep. of Korea

[21] Appl. No.: 09/129,222

[22] Filed: Aug. 5, 1998

[30] Foreign Application Priority Data

Aug. 14, 1997 [KR] Rep. of Korea ............... 97-38858

[51] Int. Cl.$^7$ ............................................. G02B 15/14
[52] U.S. Cl. ...................... 359/690; 359/683; 359/685
[58] Field of Search ............................... 359/690, 687, 359/688, 683, 676, 685

[56] References Cited

U.S. PATENT DOCUMENTS

| | | | |
|---|---|---|---|
| 4,984,876 | 1/1991 | Hata | 359/690 |
| 5,247,393 | 9/1993 | Sugawara | 359/690 |
| 5,296,969 | 3/1994 | Mihara | 359/687 |
| 5,784,205 | 7/1998 | Nakayama et al. | 359/687 |

*Primary Examiner*—Georgia Epps
*Assistant Examiner*—Jordan M. Schwartz
*Attorney, Agent, or Firm*—Howrey & Simon

[57] ABSTRACT

A zoom lens system includes three lens groups. The first lens group and the third lens group have a positive refractive power, and the second lens group has a negative refractive power. The second lens group and the third lens group move along an optical axis when zooming from a wide-angle position to a telephoto position. The zoom lens system satisfies the following conditions:

$$2.0 < \beta_2(T)/\beta_3(T) < 2.5$$

$$-0.7 < \beta_3(T) < -0.4$$

where:

$\beta_2(T)$ represents magnification ratio of the second lens group at the telephoto position; and $\beta_3(T)$ represents magnification ratio of the third lens group at the telephoto position.

5 Claims, 8 Drawing Sheets

ZOOM LENS SYSTEM

BACKGROUND OF THE INVENTION (a) Field of the Invention

The present invention relates to a zoom lens system and, more specifically, to a zoom lens system which provides a high zoom ratio and high optical quality. The system of the present invention finds utility in products such as photo cameras and video cameras.

(b) Description of the Related Art

In the prior art, a zoom lens system having a relatively high zoom ratio generally includes four lens groups. The second lens group changes a magnification ratio by moving along an optical axis, and the third or fourth lens group corrects image field by moving along the optical axis.

However, such zoom lens system is not suitable for a compact camera because the distance between the surface of the lens closest to the object side and the image field is long. Also, the effective diameter of the first lens in the first lens group is relatively large.

SUMMARY OF THE INVENTION

In view of the prior art described above, it is the object of the present invention to provide a zoom lens system that is compact and yields high optical quality.

To achieve this object, a zoom lens system according to the present invention includes three lens groups, and has a zoom ratio of about 3.0:1 and a high overall aberration quality. The first lens group, in the order of proximity to the object side, has an overall positive refractive power, the second lens group has an overall negative refractive power, and the third lens group has an overall positive refractive power. The second and the third lens groups move along an optical axis when zooming from a wide-angle position to a telephoto position. The zoom lens system according to the present invention satisfies the following conditions:

$$2.0 < \beta_2(T)/\beta_3(T) < 2.5$$

$$-0.7 < \beta_3(T) < -0.4$$

where:

$\beta_2$ (T) represents magnification of the second lens group at a telephoto position; and $\beta_3$ (T) represents magnification of the third lens group at a telephoto position.

BRIEF DESCRIPTION OF THE DRAWINGS

The above object and features of the present invention will be apparent from the following description of the preferred embodiment with reference to the accompanying drawings.

DETAILED DESCRIPTION OF THE PREFERRED EMBODIMENTS

The present invention will be described in detail with reference to the accompanying drawings.

Figure 1A:
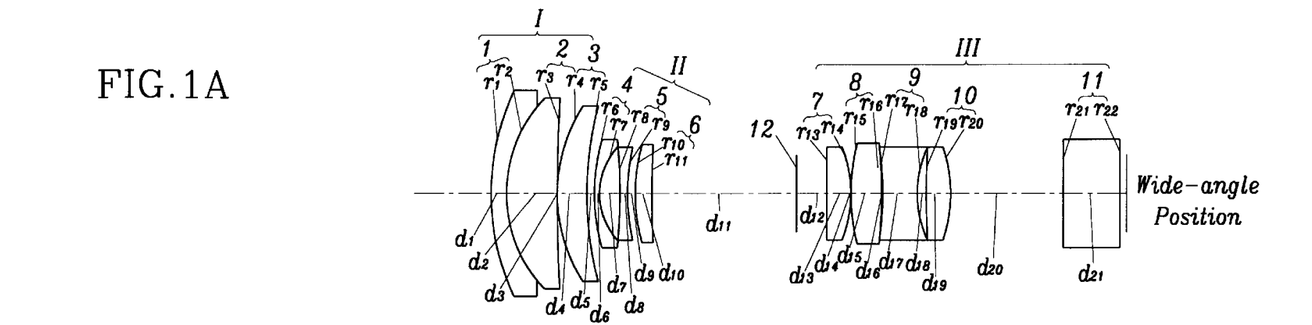
FIGS. 1A to 1C are schematic sectional views of a zoom lens system at a wide-angle position, a normal position, and a telephoto position, respectively, in accordance with embodiments of the present invention.
Figure 1B:
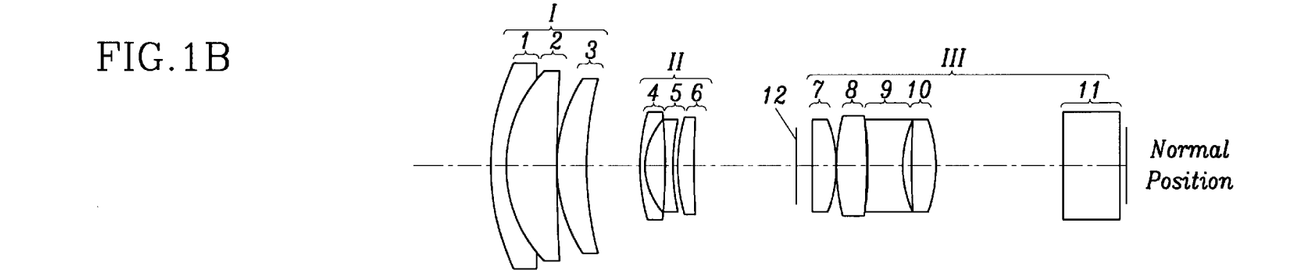
Figure 1C:
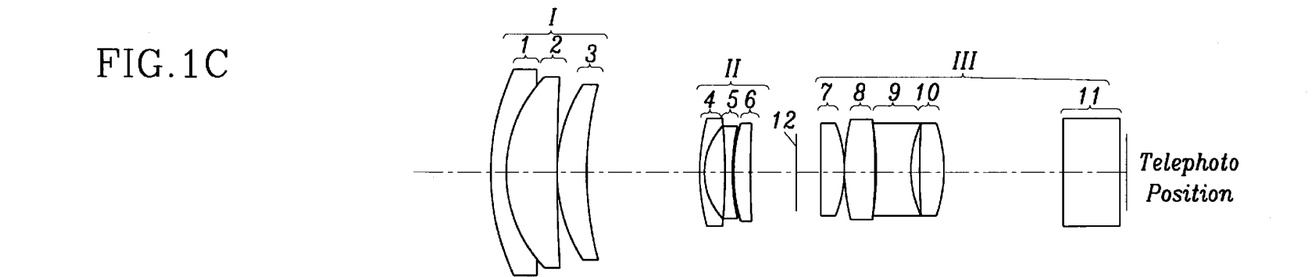
Figure 2A:
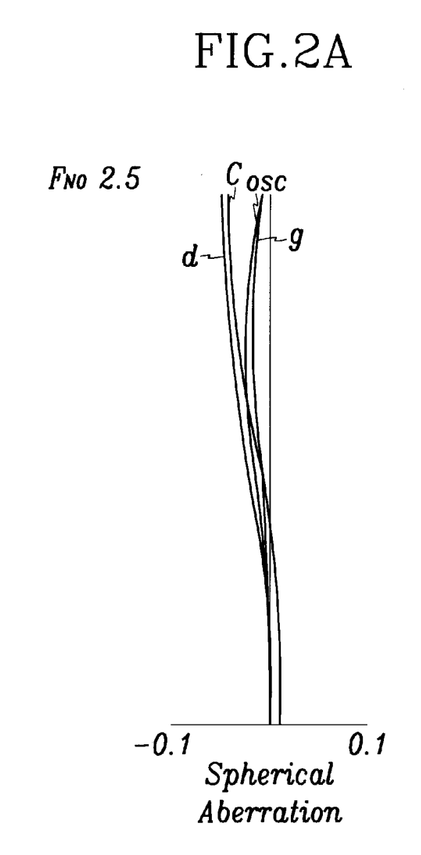
FIGS. 2A to 2C show the aberration curves of a zoom lens system at a wide-angle position in accordance with a first embodiment of the present invention.
Figure 2B:
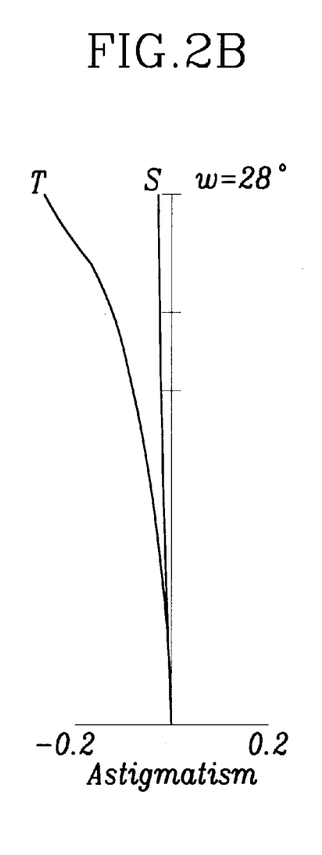
Figure 2C:
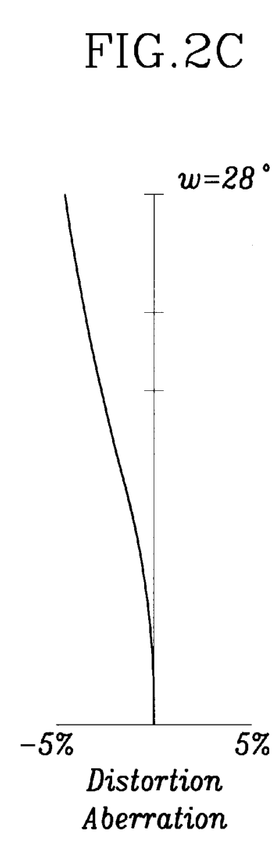
Figure 3A:
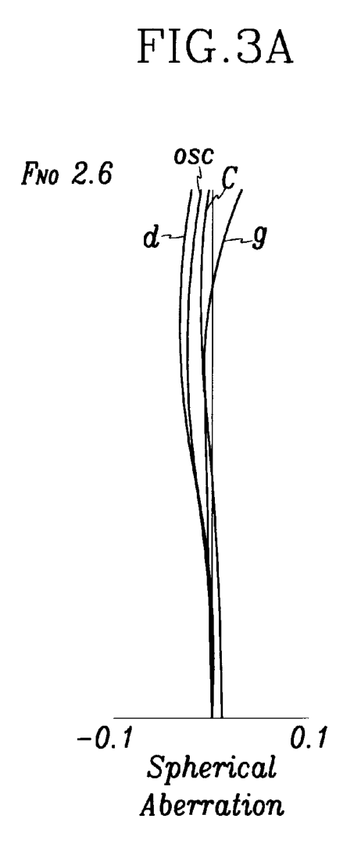
FIGS. 3A to 3C show the aberration curves of a zoom lens system at a normal position in accordance with the first embodiment of the present invention.
Figure 3B:
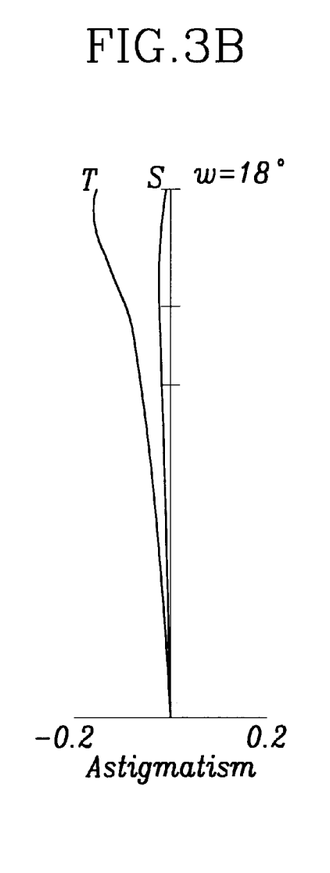
Figure 3C:
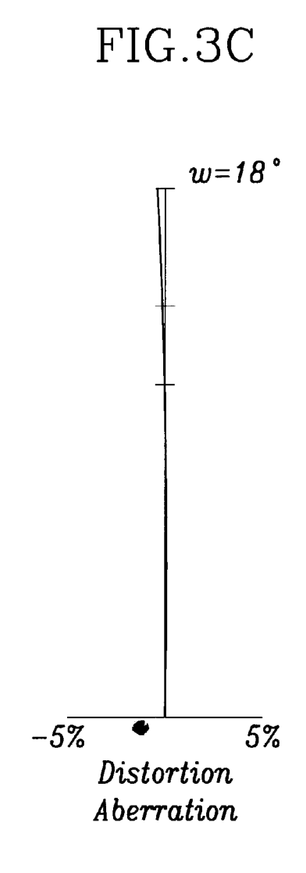
Figure 4A:
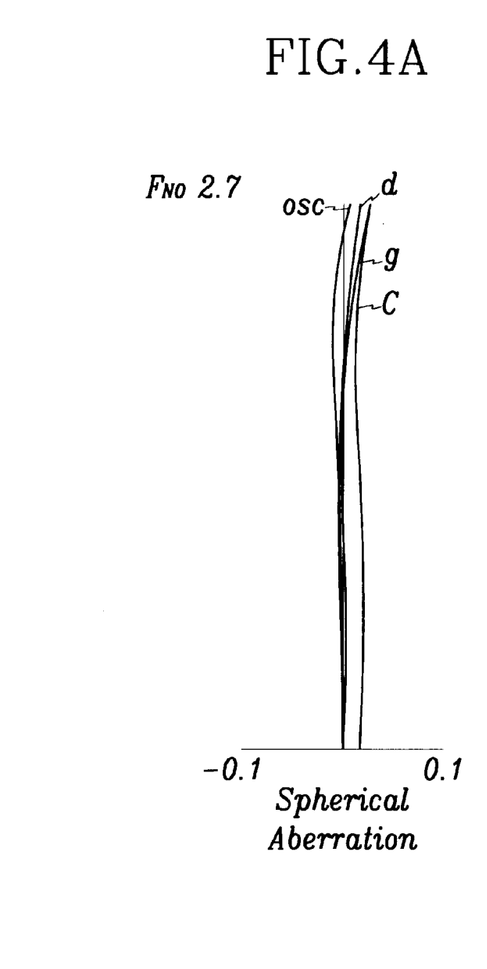
FIGS. 4A to 4C show the aberration curves of a zoom lens system at a telephoto position in accordance with the first embodiment of the present invention.
Figure 4B:
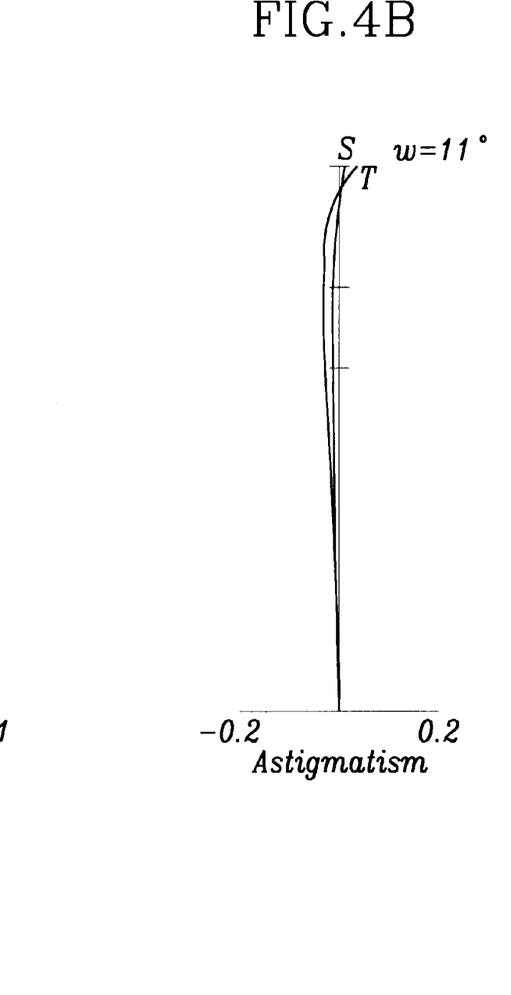
Figure 4C:
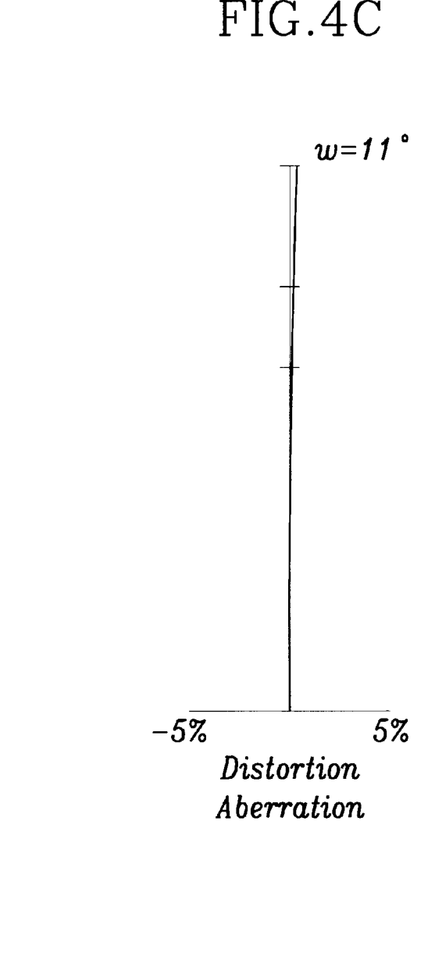
Figure 5A:
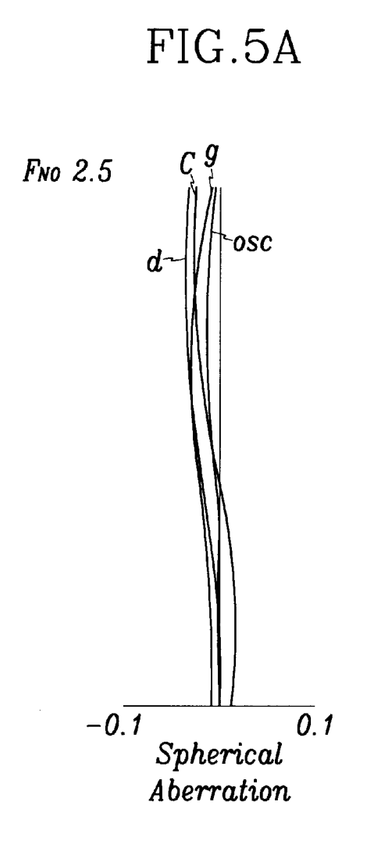
FIGS. 5A to 5C show the aberration curves of a zoom lens system at a wide-angle position in accordance with a second embodiment of the present invention.
Figure 5B:
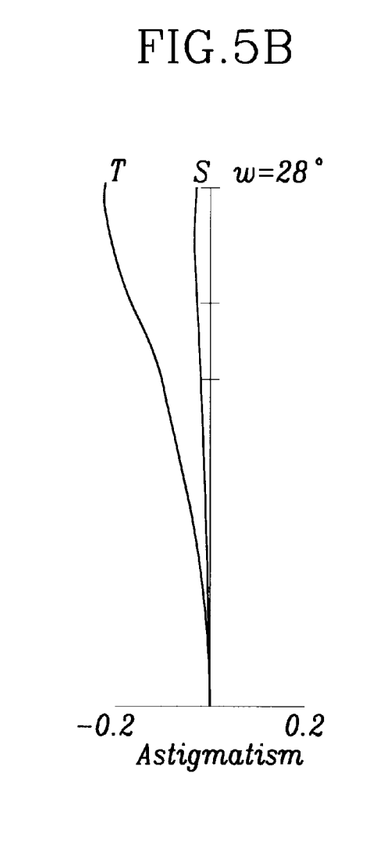
Figure 5C:
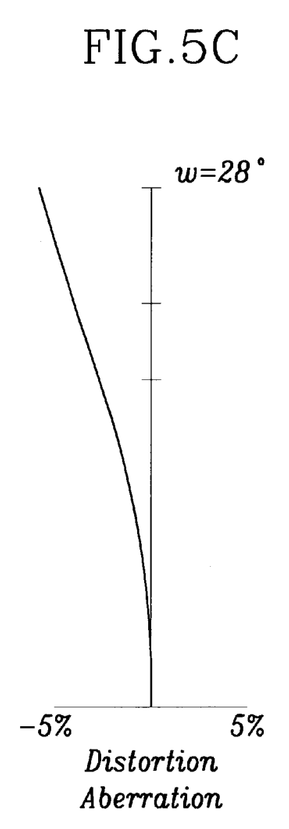
Figure 6A:
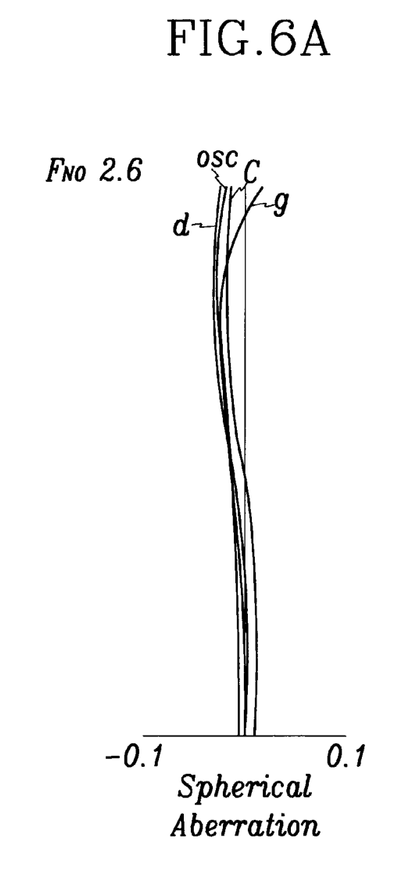
FIGS. 6A to 6C show the aberration curves of a zoom lens system at a normal position in accordance with the second embodiment of the present invention.
Figure 6B:
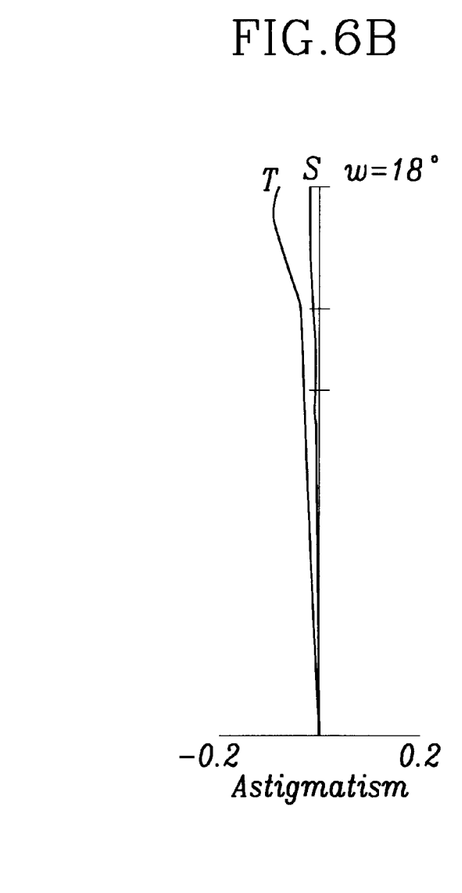
Figure 6C:
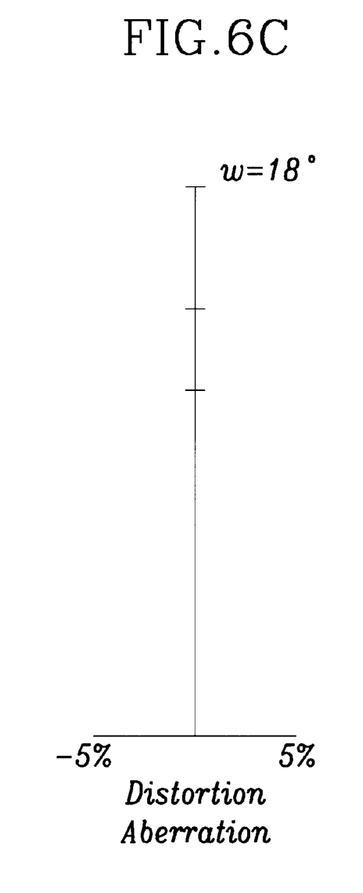
Figure 7A:
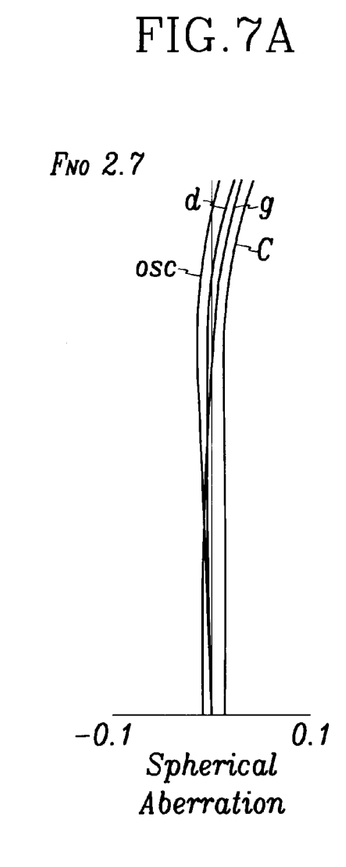
FIGS. 7A to 7C show the aberration curves of a zoom lens system at a telephoto position in accordance with the second embodiment of the present invention.
Figure 7B:
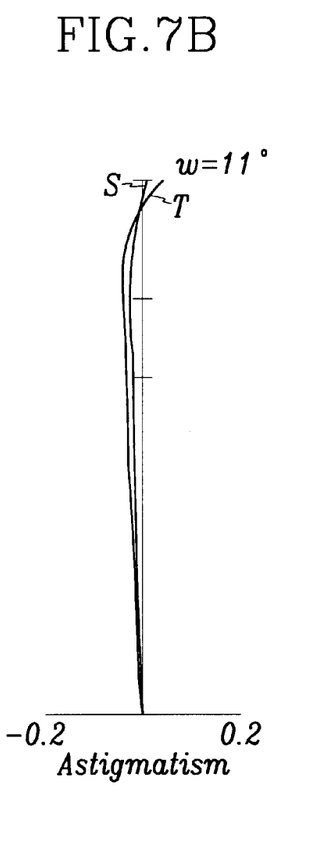
Figure 7C:
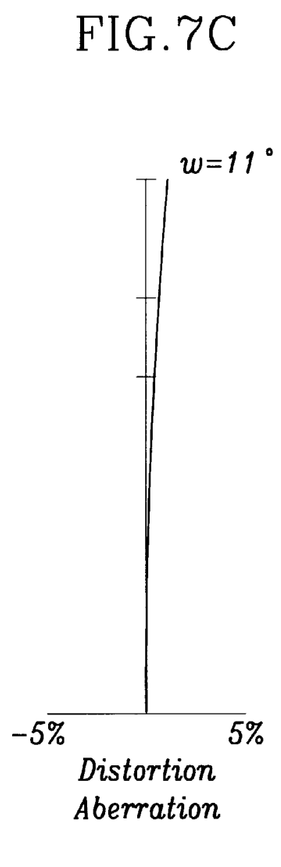

As shown in FIGS. 1A to 1C, a preferred embodiment of the present invention provides a zoom lens system which includes a first lens group I, a second lens group II, and a third lens group II. An aperture stop 12 is installed between the second lens group II and the third lens group III.

The first lens group I, having an overall positive refractive power, includes three lens elements. A first lens element 1 is a meniscus lens having a negative refractive power and is convex to the object side. A second lens element 2 is connected to the first lens element 1 and has a positive refractive power. A third lens element 3 is a meniscus lens having a positive refractive power and is convex toward the object side.

The second lens group II, having an overall negative refractive power, includes three lens elements. A fourth lens element 4 is a meniscus lens having a negative refractive power and is convex toward the object side. A fifth lens element 5 is a biconcave lens having a negative refractive power. A sixth lens element 6 has a positive refractive power and has a surface convex toward the object side.

The third lens group III, having an overall positive refractive power, includes four lens elements. A seventh lens element 7 has a positive refractive power and has a surface convex toward the image side. An eighth lens element 8 is a biconvex lens having a positive refractive power. A ninth lens element 9 is a biconcave lens having a negative refractive power. A tenth lens element 10 has a positive refractive power and has a surface convex toward the image side. The third lens group III further includes an optical low pass filter 11.

Figure 8:
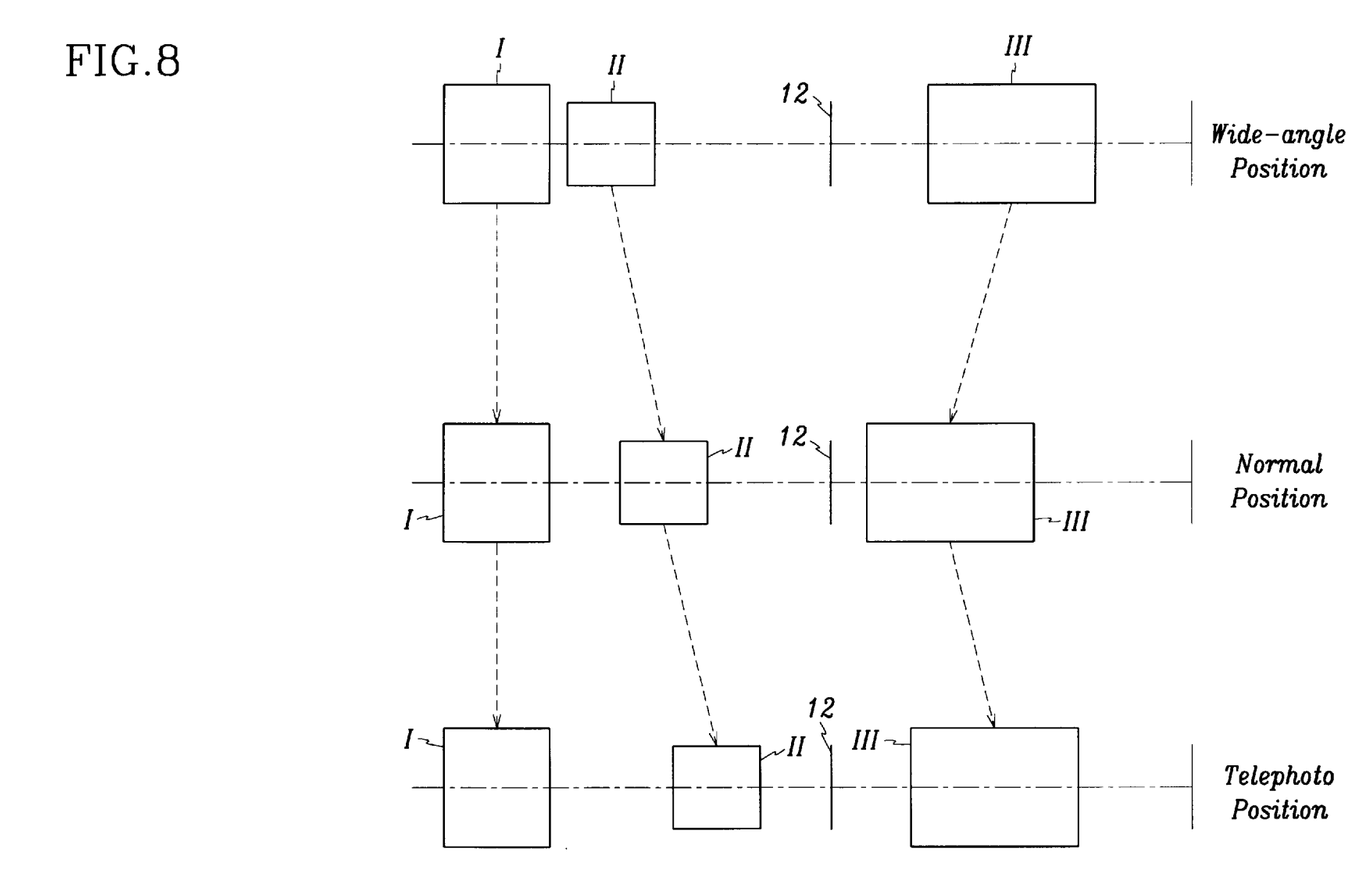
FIG. 8 presents a trajectory of a zoom lens system when zooming, in accordance with embodiments of the present invention.

When zooming from a wide-angle position to a telephoto position, the first lens group I remains fixed, and the second lens group II and the third lens group III move along an optical axis. As shown in FIG. 8, when zooming from a wide-angle position to a normal position, the second lens group II moves from the object side toward the image side, and the third lens group III moves from the image side toward the object side. And when zooming from a normal position to a telephoto position, the second lens group II further moves toward the image side and the third lens group III moves from the object side toward the image side.

Zoom lens systems consistent with embodiments of the present invention satisfy the following conditions:

$$2.0 < \beta_2(T)/\beta_3(T) < 2.5 \tag{1}$$

$$-0.7 < \beta_3(T) < -0.4 \tag{2}$$

$$0.6 < f_w/f_3 < 0.8 \tag{3}$$

where:

$\beta_2$ (T) represents magnification of the second lens group II at a telephoto position;

$\beta_3$ (T) represents magnification of the third lens group III at a telephoto position;

$f_w$ represents focal length of the zoom lens system at a wide-angle position; and $f_3$ represents focal length of the third lens group III.

Condition (1) provides comparative magnification of the second lens group II and the third lens group III at a telephoto position. If the lower limit of condition (1) is violated, a spherical aberration is excessively compensated, and a field curvature at a telephoto position is excessively compensated. If the upper limit of condition (1) is violated, the change in spherical aberration increases when zooming. Further, this increases change in astigmatism.

Condition (2) relates to magnification of the third lens group III. If the upper limit of condition (2) is violated, a spherical aberration is excessively compensated, but a field curvature is not fully compensated. If the lower limit of condition (2) is violated, the total length of the zoom lens system and the effective diameter of the lens (of the first lens group I) closest to the object side increase. This makes it difficult to obtain a compact zoom lens system.

Condition (3) relates to refractive power of the third lens group III. If the lower limit of condition (3) is violated, the movement of the third lens group III increases when zooming because the refractive power of the third lens group III decreases. This causes the total length of the zoom lens system to increase, making it difficult to obtain a compact zoom lens system. If the upper limit of condition (3) is violated, the refractive power of the third lens group III increases. As a result, the change in aberration will increase when zooming.

Values which satisfy the above conditions (1) to (3), according to the preferred embodiments of the invention, are described in the Tables below. In each of the Tables, all units of length are denominated in millimeters and the following variables are used:

$r_i$ (i=1~22) represents the radius of curvature of a refractive surface, as illustrated in FIG. 1;

$d_i$ (i=1~21) represents the thickness of a lens or the distance between the lens surfaces, as illustrated in FIG. 1;

nd represents the d-line refractive index of a lens element;

ν represents the Abbe number of a lens element; and

2ω represents the viewing angle.

Values for a first embodiment of the present invention are shown in Table 1 where: the F number ranges from 2.5 to 2.7; the focal length f ranges from 10.00 mm to 27.97 mm; and the viewing angle 2ω ranges from 56.00° to 21.5°.

TABLE 1

| Surface number | Radius of curvature $r_i$ | Distance $d_i$ | Refractive power nd | Abbe number ν |
|---|---|---|---|---|
| 1 | 40.37400 | 1.4400 | 1.80518 | 25.46 |
| 2 | 22.49300 | 5.5300 | 1.51680 | 64.20 |
| 3 | 281.24600 | 0.1800 | | |
| 4 | 20.02000 | 4.0100 | 1.69680 | 55.46 |
| 5 | 52.84100 | d5 | | |
| 6 | 42.68400 | 1.1200 | 1.77250 | 49.62 |
| 7 | 6.74800 | 3.0600 | | |
| 8 | −34.53200 | 0.9600 | 1.77250 | 49.62 |
| 9 | 26.03600 | 0.1800 | | |
| 10 | 13.22900 | 2.4700 | 1.84666 | 23.78 |

TABLE 1-continued

| Surface number | Radius of curvature $r_i$ | Distance $d_i$ | Refractive power nd | Abbe number ν |
|---|---|---|---|---|
| 11 | 73.18900 | d11 | | |
| 12 | aperture | d12 | | |
| 13 | −448.12400 | 2.0000 | 1.83400 | 37.34 |
| 14 | −18.78900 | 0.1800 | | |
| 15 | 10.14900 | 3.1600 | 1.69680 | 55.46 |
| 16 | −61.56800 | 0.1800 | | |
| 17 | −28.96000 | 4.3300 | 1.84666 | 23.78 |
| 18 | 9.48800 | 0.7900 | | |
| 19 | 57.87200 | 2.3500 | 1.72000 | 50.34 |
| 20 | −17.11200 | d20 | | |
| 21 | ∞ | 4.5000 | 1.51680 | 64.20 |
| 22 | ∞ | | | |

When zooming from a wide-angle position to a telephoto position according to the first embodiment of the present invention, changes in distances d5, d11, d12 and d20 are shown in the following Table 2.

TABLE 2

| | Wide-angle position (f = 10.00 mm) | Normal Position (f = 16.55 mm) | Telephoto Position (f = 27.97 mm) |
|---|---|---|---|
| d5 | 0.737 | 6.220 | 12.003 |
| d11 | 15.268 | 9.784 | 4.006 |
| d12 | 3.645 | 2.404 | 2.526 |
| d20 | 7.891 | 9.134 | 9.005 |

FIGS. 2A to 4C illustrate the aberration characteristics of the first embodiment, at wide-angle position, normal position, and telephoto position, respectively. In FIGS. 2A to 4C, OSC represents the sine condition; S represents astigmatism in the sagittal direction; T represents astigmatism in the tangential direction; d represents astigmatism caused by light having a wavelength of 587.56 nm; C represents astigmatism caused by light having a wavelength of 656.27 nm; ω represents the half viewing angle, and g represents astigmatism caused by light having a wave length of 435.84 nm.

Values for a second embodiment of the present invention are shown in Table 3 where: the F number ranges from 2.5 to 2.7; the focal length f ranges from 10.00 mm to 27.96 mm; and the viewing angle 2ω ranges from 56.0° to 21.5°.

TABLE 3

| Surface number | Radius of curvature $r_i$ | Distance $d_i$ | Refractive power nd | Abbe number ν |
|---|---|---|---|---|
| 1 | 41.36600 | 1.4400 | 1.80518 | 25.46 |
| 2 | 22.60000 | 5.4800 | 1.51680 | 64.20 |
| 3 | 255.61100 | 0.1800 | | |
| 4 | 20.66300 | 4.0000 | 1.69680 | 55.46 |
| 5 | 57.99900 | d5 | | |
| 6 | 47.33500 | 1.1200 | 1.77250 | 49.62 |
| 7 | 6.95200 | 3.0700 | | |
| 8 | −40.48200 | 0.9600 | 1.77250 | 49.62 |
| 9 | 26.52200 | 0.1800 | | |
| 10 | 13.22200 | 2.4800 | 1.84666 | 23.78 |
| 11 | 60.17700 | d11 | | |
| 12 | aperture | d12 | | |
| 13 | 146.14900 | 2.0400 | 1.83400 | 37.34 |
| 14 | −20.10500 | 0.1800 | | |
| 15 | 9.60600 | 3.3900 | 1.62122 | 56.12 |
| 16 | −46.22700 | 0.1800 | | |
| 17 | −26.97300 | 4.3200 | 1.84666 | 23.78 |
| 18 | 9.10200 | 0.8000 | | |

TABLE 3-continued

| Surface number | Radius of curvature $r_i$ | Distance $d_i$ | Refractive power nd | Abbe number ν |
|---|---|---|---|---|
| 19 | 57.69600 | 2.3200 | 1.72000 | 50.34 |
| 20 | −17.11100 | | | |
| 21 | ∞ | 4.5000 | 1.51680 | 64.20 |
| 22 | ∞ | | | |

When zooming from a wide-angle position to a telephoto position according to embodiment of the present invention, changes in distances d5, d11, d12, and d20 are shown in the following Table 4.

TABLE 4

| | wide-angle position (f = 10.00 mm) | Normal Position (f = 16.55 mm) | Telephoto Position (f = 27.97 mm) |
|---|---|---|---|
| d5 | 0.737 | 6.406 | 12.342 |
| d11 | 15.606 | 9.935 | 4.003 |
| d12 | 4.101 | 2.882 | 2.973 |
| d20 | 7.336 | 8.559 | 8.465 |

FIGS. 5A to 7C illustrate the aberration characteristics of the second embodiment, at wide-angle position, normal position, and telephoto position, respectively.

Values for conditions (1) to (3) of the first and second embodiments of the invention are shown in Table 5.

TABLE 5

| Conditions | First embodiment | Second embodiment |
|---|---|---|
| $\beta_2(T)/\beta_3(T)$ | 2.334 | 2.355 |
| $\beta_3(T)$ | −0.574 | −0.565 |
| $f_w/f_3$ | 0.734 | 0.730 |

As described above, the present invention provides a zoom lens system which is compact and has a high optical quality.

It will be obvious to those skilled in the art that various changes and modification can be readily made therein without departing from the scope and spirit of the invention as defined by the appended claims.

What is claimed is:

1. A zoom lens system, having an object side and an image side, comprising:
a first lens group having a positive refractive power,
a second lens group having a negative refractive power, and
a third lens group having a positive refractive power;
wherein the first lens group, second lens group and the third lens group are positioned in order from the object side to the image side and the second lens group moves toward the image side when zooming from wide-angle position to a telephoto position; wherein the third lens group moves toward the object side and then moves toward the image side when zooming from the wide-angle position to the telephoto position; and wherein the zoom lens system satisfies the following conditions:

$2.0 < \beta_2(T)/\beta_3(T) < 2.5$ $-0.7 < \beta_3(T) < -0.4$ where:
$\beta_2$ (T) represents magnification of the second lens group at a telephoto position; and
$\beta_3$ (T) represents magnification of the third lens group at a telephoto position.

2. The system of claim 1, wherein the zoom lens system further satisfies the following condition:

$0.6 < f_w/f_3 < 0.8$ where:
$f_w$ represents focal length of the zoom lens system at a wide-angle position; and
$f_3$ represents focal length of the third lens group.

3. The system of claim 1, wherein the first lens group includes a first lens element which is a meniscus lens having a negative refractive power and is convex toward the object side, a second lens element which has a positive refractive power and is connected to the first lens element, and a third lens element which is a meniscus lens having a positive refractive power and is convex toward the object side.

4. The system of claim 1, wherein the second lens group includes a first lens element which is a meniscus lens having a negative refractive power and is convex toward the object side, a second lens element which is a biconcave lens having a negative refractive power, and a third lens element which has a positive refractive power and has a surface convex toward the object side.

5. The system of claim 1, wherein the third lens group includes a first lens element which has a positive refractive power and has a surface convex toward the image side, a second lens element which is a biconvex lens having a positive refractive power, a third lens element which is a biconcave lens having a negative refractive power, and a fourth lens element which has a positive refractive power and has a surface convex toward the image side.

\* \* \* \* \*